June 27, 1967    J. P. WOODS ET AL    3,328,754
SEISMIC RECORD COMPUTER OR PROFILE PLOTTER
Filed July 17, 1958    6 Sheets-Sheet 1

Attest:
Charles F. Steininger

INVENTOR.
JOHN P. WOODS
CLIFFORD D. DRANSFIELD
BY TOM PRICKETT, JR.

Norbert E. Birch

Fig. 3

June 27, 1967  J. P. WOODS ET AL  3,328,754

SEISMIC RECORD COMPUTER OR PROFILE PLOTTER

Filed July 17, 1958  6 Sheets-Sheet 3

Attest:
Charles F. Steininger

INVENTOR.
JOHN P. WOODS
CLIFFORD D. DRANSFIELD
BY TOM PRICKETT, JR.

INVENTOR.
JOHN P. WOODS
CLIFFORD D. DRANSFIELD
BY TOM PRICKETT, JR.

June 27, 1967  J. P. WOODS ET AL  3,328,754
SEISMIC RECORD COMPUTER OR PROFILE PLOTTER
Filed July 17, 1958  6 Sheets-Sheet 5

Fig. 8

Attest:
Charles F. Steininger

INVENTOR.
JOHN P. WOODS
CLIFFORD D. DRANSFIELD
BY TOM PRICKETT, JR.

Fig. 9

United States Patent Office 3,328,754
Patented June 27, 1967

3,328,754
SEISMIC RECORD COMPUTER OR
PROFILE PLOTTER
John P. Woods and Clifford D. Dransfield, Dallas, and Tom Prickett, Jr., Richardson, Tex., assignors to The Atlantic Refining Company, Philadelphia, Pa., a corporation of Pennsylvania
Filed July 17, 1958, Ser. No. 749,190
9 Claims. (Cl. 340—15.5)

The present invention relates to a novel method and apparatus for correcting seismic records obtained according to conventional seismic prospecting methods and producing from such corrected records cross section plots representing a two-dimensional view of subsurface strata. In a more particular aspect, the present invention relates to a method and apparauts for adjusting the positions of seismic traces on a seismic record; correlating significant characteristics of a plurality of seismic traces in accordance with predetermined displacement and relative displacement information; and producing, from such adjusted and correlated seismic traces, cross section plots depicting the depth and attitude of the various subsurface strata.

In order to clearly illustrate the problems involved in correcting seismic records and facilitate a description of prior art devices adapted to perform such correction and their relation to the present invention, reference should be made to FIGURES 1 and 2 of the drawings, wherein.

Figure 1:
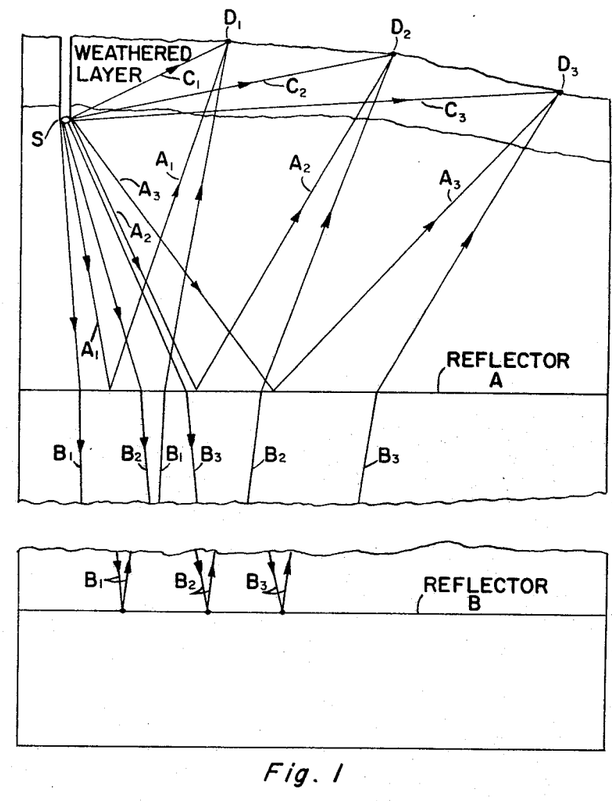
FIGURE 1 represents a cross sectional view of subsurface earth formations and a typical seismic prospecting arrangement.
Figure 2:
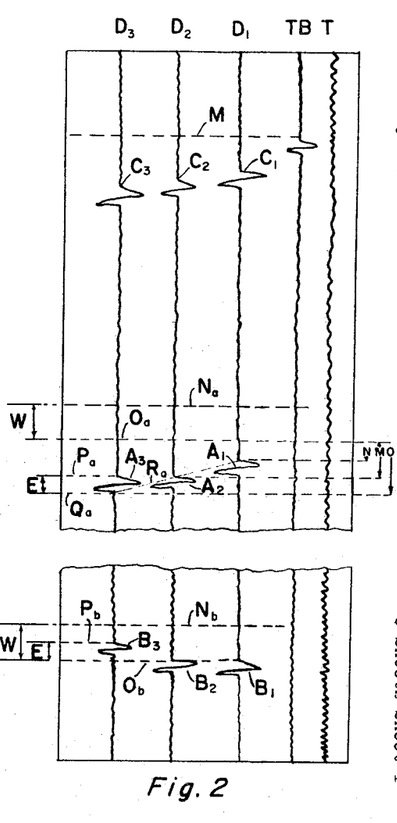
FIGURE 2 represents a seismic record obtained as a result of seismic prospecting as depicted in FIGURE 1.

In seismic prospecting, elastic waves are created at or adjacent to the surface of the earth by detonating an explosive charge, by dropping a heavy weight to the surface of the earth, or by other like means, as at point S on FIGURE 1. These elastic waves are transmitted through the earth, and at least a portion of such waves traverse downwardly through the earth and are reflected back to the earth's surface from the interfaces of subsurface strata due to discontinuities or variations in the elastic wave transmitting properties of such strata. The travel paths of such reflected waves are shown in FIGURE 1 as path $A_1$, $A_2$, and $A_3$, reflected from reflecting interface A, and paths $B_1$, $B_2$, and $B_3$, reflected from reflecting interface B. For purposes of illustration, reflecting interface B is assumed to be at great depth with respect to the surface of the earth and with respect to reflecting interface A. Another portion of the elastic waves is transmitted directly to the surface of the earth as shown by paths $C_1$, $C_2$, and $C_3$ of FIGURE 1. By placing geophones or seismic pickups, as depicted by points $D_1$, $D_2$, and $D_3$ of FIGURE 1. on or adjacent the surface of the earth at points displaced from the origin of the seismic energy, the arrival of the various waves at the surface of the earth may be detected. These geophones convert the detected waves to equivalent electrical signals which are then amplified and recorded in a form known as a seismogram or seismic record. The seismic record consists of a plurality of traces arranged in parallel relation each representative of the output of an individual geophone. Such a seismic record, obtained as a result of seismic exploration employing an arrangement such as that of FIGURE 1. is shown in FIGURE 2 where traces $D_1$, $D_2$, and $D_3$ represent the outputs of geophones at points $D_1$, $D_2$, and $D_3$, respectively, of FIGURE 1. It is conventional practice to record on a single seismic record the outputs from about 12 to 24 geophones spaced over distances up to approximately 3,000 feet from the source of energy. The seismic record also generally includes an additional trace designating the instant at which the seismic energy was created, generally referred to as a "time break" trace and represented by trace TB of FIGURE 2, and one or more constant frequency timing signals designated T in FIGURE 2 which may be correlated with the significant events on the seismic traces to determine travel time from a selected reference time to each event. With this latter information, the seismic record can be examined to determine the time required for seismic energy to travel downwardly through the earth and be reflected back to the geophones. This travel, time information may, in turn, be converted to depth information by combination with known or previously measured velocity information; and, by correlating a plurality of records obtained over a selected exploratory area, the attitude or dip, curvature and the like of such subsurface strata may be determined. This general method of seismic prospecting thus permits the obtention of valuable geological information, particularly useful in exploration for hydrocarbon deposits.

A long-standing difficulty in employing seismic prospecting methods is that of analyzing the seismic records. Due to the complexity of elastic waves, the many factors affecting their transmission through the earth, the multiplicity of reflecting barriers within the earth and the necessary physical arrangement of geophones, interpretation of these seismic records is extremely difcult. To aid in the interpretation of seismic records, it is generally necessary to correct each seismic trace to compensate for certain known errors in travel time and to correct the relative travel time relationship of a number of individual traces to correlate the same significant events appearing on each of a plurality of related traces. It is only by such correction and correlation of significant events that true travel times and true depth and attitude of subsurface strata can be ascertained.

Referring again to FIGURE 2, traces $D_1$, $D_2$, and $D_3$ have been greatly simplified for illustrative purposes, and the recorded signals shown are not necessarily an accurate representation of an actual received signal. However, pulses $C_1$, $C_2$, and $C_3$ represent the pulses received by detectors $D_1$, $D_2$, and $D_3$, respectively, by direct transmission from the source of energy and are generally referred to as "first break" pulses. Pulses $A_1$, $A_2$, and $A_3$ represent pulses received by detectors $D_1$, $D_2$, and $D_3$ as a result of reflection from reflector A, and pulses $B_1$, $B_2$, and $B_3$ represent the pulses detected by detectors $D_1$, $D_2$, and $D_3$ as a result of reflection from reflector B. As pointed out above, the reception of all these pulses after a specific length of time following creation of the seismic wave is subject to certain errors which result in the recorded travel times differing from the true travel time. Accordingly, lines $N_a$ and $N_b$ of FIGURE 2 represent the positions on the seismic record at which each of the pulses from reflector A and reflector B, respectively, would have been received except for the subject errors.

One travel time error which must be taken into account is that error caused by the transmission of seismic energy through the so-called low velocity or weathered layer of the earth shown in FIGURE 1. This weathered layer is the upper portion of the earth extending to depths as great as 50 to 100 feet and is composed of relatively unconsolidated matter. Accordingly, seismic energy travels at a relatively low velocity through the weathered layer. Therefore, in timing the transmission of seismic energy downwardly to a reflecting barrier and back to the surface of the earth, corrections must be applied for the additional time required for the energy to penetrate the weathered layer as compared with the time required to penetrate the higher velocity subsurface formations. This correction is commonly referred to as a weathering correction. This weathering correction can be computed by well known methods and expressed in terms of travel time. Referring to FIGURE 2, pulses $B_1$, $B_2$, and $B_3$ are recorded later than they should be by the distance W between lines $N_b$ and $O_b$. Similarly, pulses $A_1$, $A_2$, and $A_3$ would be received later than normal by the distance W between line $N_a$ and $O_a$. However, for reasons which will be explained hereinafter, pulses $B_1$ and $B_2$ fall on line $O_b$; whereas, pulses $A_1$ and $A_2$ do not fall on line $O_a$; and pulses $B_3$ and $A_3$ do not fall on either lines $O_a$ or $O_b$. Depending upon the character of the exploratory area, separate and different weathering corrections may desirably be applied to each geophone of a single group of geophones or it may suffice to apply the same weathering correction to an entire group of geophones. For purposes of illustration, however, it will be assumed that the same weathering correction may be applied to each geophone of the grouping illustrated and the travel time of each of the pulses reflected from a particular reflector will be corrected by the same amount. Thus, the distance between $N_a$ and $O_a$ will be the same for pulses $A_1$, $A_2$, and $A_3$, and the distance between $N_b$ and $O_b$ will be the same for pulses $B_1$, $B_2$, and $B_3$. Since there is only one weathered layer represented in each trace, the correction will be non-variable or static over the entire length of an individual trace. This is illustrated by the fact that the distance between $N_a$ and $O_a$ and the distance between $N_b$ and $O_b$ are equal despite the fact that the pulses related to these lines are received from reflectors at substantially different depths.

A second source of error in determining travel time from seismic records, which is particularly significant in hilly or mountainous regions, is that error caused by differences in elevation of one geophone with respect to the other geophones. Obviously, a geophone located in a valley will detect seismic energy reflected from a given subsurface barrier at an earlier time than another geophone located at a higher elevation would detect energy reflected from the same barrier at the same distance from the source of energy. Therefore, in order to determine actual travel time of seismic energy reflected from a given barrier and correlate reflections from this barrier from one trace to another, corrections must be applied to compensate for those differences in arrival times at the various geophones which are caused by differences in elevation. In FIGURE 1, geophone $D_3$ is shown to be located at a substantially lower elevation than geophones $D_1$ and $D_2$. Accordingly, pulse $B_3$ will arrive slightly earlier than pulses $B_1$ and $B_2$; and pulse $A_3$ will arrive earlier than pulses $A_1$ and $A_2$, disregarding an additional error which will be hereinafter discussed. One method of compensating for this error caused by elevation is to again express this error in terms of travel time and adjust the position of the significant pulses to compensate for the error. As is the case in the weathering correction, a single travel time correction will apply throughout the length of an individual trace; that is, will be static over the entire length of each trace. This is illustrated by the fact that the distances E between $P_a$ and $Q_a$ and between $P_b$ and $O_b$ of FIGURE 2 are exactly the same. In addition, the elevation correction will be different for each trace of a related group of traces under consideration if each geophone is located at a different elevation. If the elevation of geophones $D_1$ and $D_2$ is taken as a reference plane, then no elevation correction will be necessary in traces $D_1$ and $D_2$ but an elevation correction must be applied to trace $D_3$. However, if $D_1$ and $D_2$ were not at the same elevation or a different arbitrary reference plane were selected, such as, the first break pulse on one of the traces, an arbitrary reference plane passing through the actual source of energy, or some other time point independent of such references, an elevation correction would be necessary to adjust the position of the pulses appearing on traces $D_1$ or $D_2$ or both and this correction would not necessarily be the same as that for $D_3$.

Obviously, since both the weathering and elevation corrections, referred to above, will be static or nonvariable throughout the length of a single seismic trace, these two corrections may be algebraically combined to form a single correction. These lumped or combined weathering and elevation corrections are commonly referred to in the art as a "static" correction, and the cumulative or static correction will be the same or nonvariable throughout the entire length of an individual seismic trace but will possibly be different or vary from trace to trace in each related group of traces under consideration. In other words, the static correction in the case illustrated in FIGURES 1 and 2 would be equal to the difference between W and E for trace $D_3$ and would be equal to W alone for traces $D_1$ and $D_2$.

The static corrections discussed thus far obviously assume that the travel paths from the source of energy to the reflecting barriers and back to the surface of the earth are substantially vertical paths. However, this assumption is at odds with the geometry or horizontal spacing of the geophones from the source of energy, and a third correction, known as a "normal move-out" correction, is necessary to compensate for the geophone spacing before true depth information can be determined. For example, it is general practice to employ a group, or array, of geophones in order to obtain travel time or depth information for an extended vertical section of the earth as opposed to a single vertical line through the earth and in order to permit comparison or combination of signals received by more than one geophone. A great number of different patterns may be employed, but it is general practice to space each geophone a different distance from the source of energy along a straight line either pointing toward the source of energy or laterally displaced from the source. FIGURE 1 illustrates a pattern, known as an "end-on" pattern in which the geophones are in a straight line pointing toward the source of energy. As a result of this spacing of each geophone a finite distance from the source of energy, energy reflected from a single subsurface reflector will arrive at the geophones later than it would if it followed a vertical path from the source of energy to the reflector and back to the geophones since an angular or slant ray path is longer than a vertical path. In addition, as the distance from the source of energy of each successive geophone is increased, energy reflected from a single horizontal subsurface reflector will necessarily follow successively longer paths to each more remote geophone and the measured travel time thereto will be succesively greater. These observations are illustrated by travel paths $A_1$, $A_2$, and $A_3$ of FIGURE 1. It is to be observed that travel path $A_1$, from point S to geophone $D_1$, is somewhat longer than a vertical travel path from point S to the same reflector and back to a point immediately adjacent point S. In addition, travel path $A_2$ is longer than travel path $A_1$ and travel path $A_3$ is still longer than $A_1$. Accordingly, as shown in FIGURE 2, pulse $A_1$ will be recorded later than it would be recorded if it followed a substantially vertical path by the distance NMO. Pulse $A_2$ will also be recorded at a later time than it would if it followed a substantially vertical path, but this time difference will be greater than it was pulse $A_1$. Finally, pulse $A_3$ would be recorded later than either pulses $A_1$ and $A_2$ because of the much longer travel path which it must follow. It should be noted that the intersection of lines $Q_a$ and $R_a$ represent the point at which pulse $A_3$ would be recorded except for its erroneous early arrival due to the difference in elevation of detector $D_3$. In view of the above, it is thus necessary to apply a time correction to trace $D_1$ at the location thereon of pulse $A_1$ in order to ascertain the true travel time and the true depth of reflector A. This correction would be equal to the distance from line $O_a$ to the beginning of pulse $A_1$, i.e., the distance NMO shown in FIGURE 2. Similarly, traces $D_1$ and $D_2$ must be corrected at the locations of pulses $A_2$ and $A_3$ but by somewhat greater amounts as shown by the distances NMO for these pulses. With the locations of these pulses corrected in this manner the true depth of reflector A will be indicated and the fact that reflector A is a horizontal reflecting plane and does not dip from the point at which pulse $A_1$ was reflected to the point at which pulse $A_3$ was reflected will be apparent.

If one were considering only reflector A, the application of the normal move-out corrections would be simple, since one could add these corrections to the previously discussed static corrections, as they are applied to appropriate traces, and simply move the entire trace a distance equal to the total correction. However, in an analyzing seismic information, one is always interested in determining the depth and attitude of more than one reflector; and, consequently, reflectors located at successively greater depths than reflector A are considered. The record must, therefore, be corrected at these later points in time in order to properly locate pulses received from deeper reflectors and ascertain the true depth and attitude of these reflectors. This complicates the application of the normal move-out correction. Referring to travel paths $B_1$, $B_2$ and $B_3$ of FIGURE 1 and recalling that reflector B has been assumed to be at great depth with respect to the surface and with respect to reflector A, it will be noted that the reflecting angles of paths $B_1$, $B_2$ and $B_3$ are substantially the same and, thus, that there is little difference in the lengths of the three travel paths. In fact, at infinite depth, the difference is zero. Accordingly, there would be no observable difference between the arrival times of pulses $B_1$, $B_2$, and $B_3$ at detectors $D_1$, $D_2$, and $D_3$, respectively, and these pulses would be properly correlated on line $O_b$ of FIGURE 2 and show the proper attitude of reflector B. Further, the length of travel path $B_1$ is very great as compared with the distance between S and $D_1$ and, for all intents and purposes, is a substantially vertical path. Accordingly, the normal move-out correction for pulse $B_1$ becomes insignificant and can be ignored. The same considerations apply to pulses $B_2$ and $B_3$ at this great depth. As a result, no normal move-out correction of pulses $B_1$, $B_2$, and $B_3$ is necessary since the normal move-out correction is based on a series of assumptions and calculations, and the normal move-out error at great depth is within the range of error of the calculations. Thus, the normal move-out correction for reflector A or at the early part of the record is a maximum and gradually decreases toward the end of the record and approaches zero at infinite time or infinite depth. Accordingly, in applying the normal move-out correction, a different travel time correction must be applied to each seismic trace of a related group of traces to compensate for the different spread or spacing of each geophone from the source of energy and this travel time correction must be variable or progressively decrease throughout the length of each single trace. Thus, a continuously decreasing travel time correction must be applied to trace $D_1$ which has its maximum value at the beginning of the trace and approaches zero toward the end of the trace; and larger, similarly variable, corrections must be applied to traces $D_2$ and $D_3$, respectively. This correction can also be calculated from known relationships by employing predetermined velocity and spread information and can be expressed in terms of travel time by the relationship $Y=f(X)$, where X is the time along the length of a trace and Y is the incremental correction at each instant of time. Obviously, a plot of this functional relationship can be made or it can be expressed by a series of digital values. Because of the variable nature of this normal move-out correction, this correction is normally referred to in the art as a "dynamic" correction.

It has heretofore been the practice in the field of seismic prospecting to visually inspect seismic records to observe possible reflecting horizons, compute the enumerated trave time corrections, apply these corrections to each trace or a group of traces as appropriate, and finally to piece together a plurality of seismic records and plot a two-dimensional cross section of subsurface strata either in terms of true travel time or depth. Such interpretation, correction and plotting is obviously dependent upon the experience of the interpreter, including, his ability to recognize significant events due to a reflecting horizon from a complex set of individual traces, and the accuracy of the interpreter's application of the corrections; or, in essence, the ability of the interpreter to mentally distort, visualize and correlate significant events appearing on a plurality of individual traces and related groups of seismic records. Efforts have been made in the past to simplify such interpretation by devising mechanical drafting apparatus which will mechanically apply necessary corrections and, in some cases, prepare cross section plots of a plurality of seismic records; but such mechanical aids do not eliminate the major portion of the personal element involved and their use is time consuming.

More recently apparatus for automatically applying corrections to seismic traces and plotting cross section maps of corrected traces in their proper relation have been developed. Since depth below the surface of the earth is expressed on a seismic field record in terms of travel time, the obvious means of correcting a seismic trace to compensate for weathering, elevation, and normal move-out errors, that is, to apply static and dynamic corrections, is to apply compensating time delays prior to the plotting of the trace on a cross section map. Basically, these automatic correctors include one or more detectors adapted to scan the seismic traces on the field record and generate an equivalent signal; an auxiliary storage or rerecording system for temporarily storing seismic traces; a memory system for temporarily storing static and dynamic time delay information; a reading system for reading time delay information from the memory system; a translator for applying time delay information to the seismic traces during the process of recording on the auxiliary storage, during detection from the auixiliary storage or during transmission of the output signal from the auxiliary storage; and one or more recording elements adapted to produce a cross section plot of corrected seismic traces.

The memory systems employed in such automatic correctors are generally divided into two sections: one for the storage of static time delay information, and the other for the storage of dynamic time delay information. Static time delay information is generally stored in the form of the shaft positions of calibrated potentiometers, or simply the positions of shiftable mechanical linkages. Dynamic time delay information is most often stored in the form of a preformed mechanical cam; digital data on punched tape; an electrically conductive, plotted curve; or the shaft positions of calibrated, tapped potentiometers. Reading or detection of the stored time delay information will obviously be complementary to the storage medium employed and, accordingly, would include mechanical linkages, cam followers, electronic punched tape readers, curve followers, and automatic sequencing switches. Translation or application of the detected time delay information to the seismic traces also includes any of the generic types of time delay systems, such as, magnetic delay systems in which the auxiliary storage medium is the magnetic drum of the delay system and this is combined with a plurality of fixed transducers time-spaced about the magnetic drum together with an automatic switch responding to time delay information to switch from one head to another, movable transducers whose time position with respect to the magnetic drum is changed in accordance with time delay information, either during rerecording of the seismic traces on the auxiliary storage medium or during detection of the seismic traces from the auxiliary storage medium, or a single fixed transducer and a relatively movable auxiliary storage drum whose speed of rotation can be changed relative to that of the field record drum during rerecording or storage or relative to the cross section plotting drum during transfer from the auxiliary storage drum; multicontact electrical or electronic delay line systems switched in accordance with time delay information; and other known time delay systems.

This brief review of the apparatus presently employed for correcting seismic records in itself suggests a number of obvious disadvantages. For example, such systems are massive, involved complicated mechanical, electrical, or electronic systems for encoding the memory, reading the memory, and applying time delay information to appropriate seismic traces at appropriate times; require delicate adjustment and calibration; and are extremely difficult to maintain in operating condition. The most serious objection to the systems in use at the present time is the requirement that a separate and distinct auxiliary recording or storage medium must be employed in order to practically translate or apply corrections expressed in terms of time delay to the seismic traces. This necessity of employing an auxiliary recording or storage medium leads to serious problems in synchronizing the storage medium with the field record and/or the cross section plotting medium and is often responsible for distortion of the seismic trace. Equally objectionable features of all present day systems are the necessity of employing closely calibrated potentiometers and the like for encoding time correction information, particularly for the encoding of static time delay information; and the complete absence of any means for monitoring or following the translation or application of time delay information to the seismic trace.

It is, therefore, an object of the present invention to provide a simple and accurate method and apparatus for seismic record correction.

Another object of the present invention is to provide a simple and accurate seismic record corrector which requires a minimum of maintenance.

A further object of the present invention is to provide a seismic record corrector which eliminates the necessity of transferring seismic traces to an auxiliary storage medium and the consequent distortion and misalignment involved in such transfer.

Still another object of the present invention is to provide a seismic record corrector which permits the plotting of a cross section map of corrected seismic traces directly from the original field record.

A still further object of the present invention is to provide a seismic record corrector which, in essence, correlates like significant features of a plurality of seismic traces by changing the relative spatial position of such features in accordance with predetermined information.

Another and further object of the present invention is to provide a seismic record corrector which, in effect, applies like significant features of seismic traces to actual travel time or depth references by changing the spatial position of such features to eliminate predetermined inaccuracies.

A still further object of the present invention is to provide a seismic record corrector which spatially changes the position of significant features of a seismic trace concomitantly with the detection of the seismic trace from the field record.

Another and further object of the present invention is to provide an improved translating mechanism for moving a detection element about a field record mounted on a drum to dynamically change the position of the detector with respect to significant features on the seismic trace.

Still another object of the present invention is to provide an improved mechanism for moving a magnetic transducer about a drum to dynamically change the relative position of the transducer with respect to the drum.

A still further object of the present invention is to provide an improved supporting structure for a dynamically movable magnetic transducer which is adapted to maintain proper alignment of the transducer with respect to a drum surface.

A further object of the present invention is to provide a novel visual display system adapted to display the position of a movable detecting or recording element relative to a fixed reference on a record or recording medium.

Another object of the present invention is to provide an improved system for encoding predetermined correction information in a seismic record corrector.

Still another object of the present invention is to provide improved apparatus for visually displaying correction information during the encoding of such information in a seismic record corrector and during the application of such correction data to a seismic trace.

Yet another object of the present invention is to provide an improved apparatus for visually displaying correction data during the encoding of such data in a seismic record corrector, whereby the necessity of employing closely calibrated encoding elements is eliminated.

These and other objects of the present invention will be apparent from the following detailed description when read in conjunction with the accompanying drawings; wherein.

In accordance with the present invention, it has been found that time or depth correlation of significant features of a plurality of seismic traces and application of each significant feature of each seismic trace to true travel time or true depth references can be accomplished by sequentially detecting the seismic traces from a field record while concomitantly changing the point on each said seismic trace at which each incremental portion of the trace is detected in accordance with an electrical command signal which is a function of predetermined correction data. Novel components of the apparatus of this invention include a novel servo operated mechanism for changing the relative spatial position of the detector with respect to a seismic trace in response to an electrical command signal and a novel supporting structure for the movable detector. An additional novel component is a visual display system for continuously observing the relative spatial position of the detector during encoding of individual corrections and during the application of corrections to a seismic trace.

Figure 3:
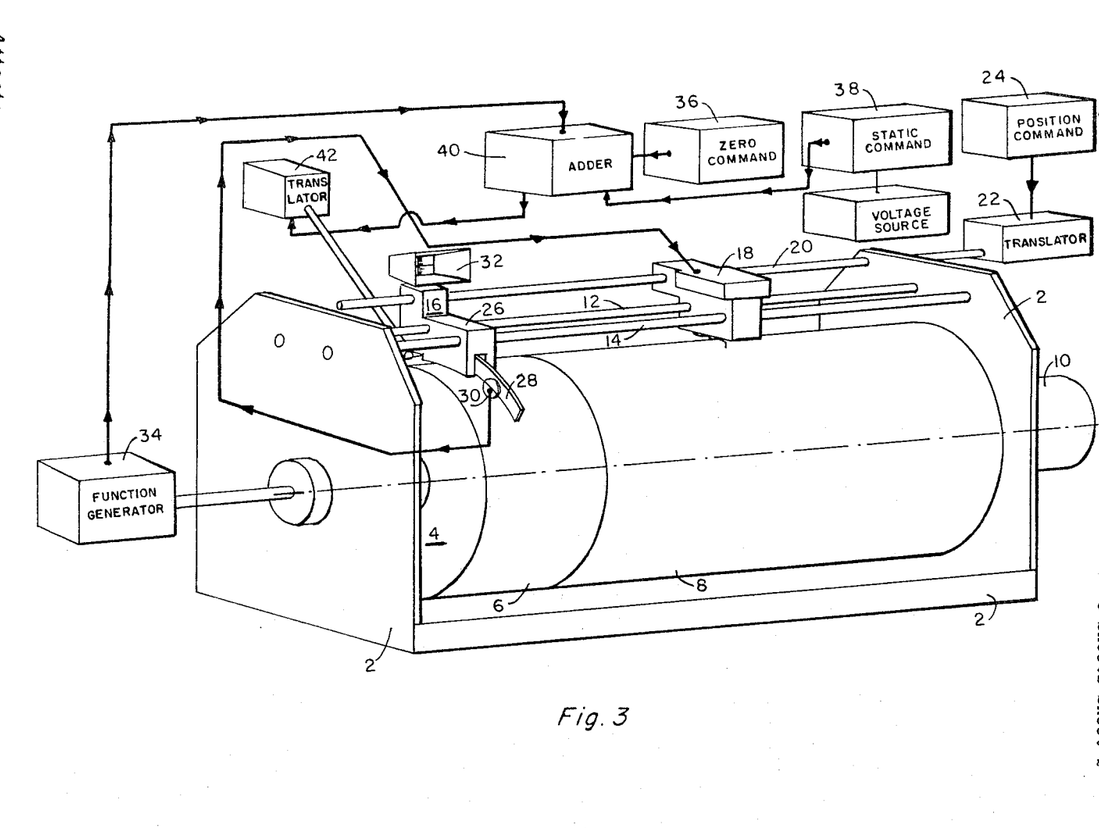
FIGURE 3 is a schematic drawing of the record corrector of the present invention.

Referring in detail to FIGURE 3 of the drawings, the record corrector of the present invention is made up of the basic components designated below. The entire record corrector is mounted on frame 2. Rotatable drum 4 is supported by a suitable shaft and bearings (not shown) on frame 2. Drum 4 is made up of a field record carrying portion 6 and a cross section map carrying portion 8. Drum 4 is rotated by suitable means, such as a motor 10. Bars 12 and 14 are rigidly connected to frame member 2 above drum 4. Slidably mounted on bars 12 and 14 adjacent field record portion 6 of drum 4 is detector unit 16. Detector unit 16 is electrically connected directly to recorder 18. It is desirable in most cases to include a signal amplifier in the electrical line connecting detector unit 16 and recorder 18; and, depending upon the form in which the seismic trace is recorded, some form of signal converter, such as a demodulator. However, these elements are conventional, and their inclusion or exclusion would be obvious to one skilled in the art. Accordingly, in referring to a "direct electrical connection" between detector unit 16 and recorder 18, such necessary components are assumed to be included, and the direct electrical connection between detector unit 16 and recorder 18 is meant to exclude only auxiliary transfer mediums on which the seismic signal is stored prior to or during the process of correction as is the universal practice in all prior art automatic record correctors. Recorder 18 is also slidably mounted on bars 12 and 14 and is, of course, mounted adjacent cross section map portion 8 of drum 4. Bar 20 is slidably mounted on frame member 2 above drum 4 and is coupled to detector unit 16 and recorder 18 in a manner such that detector unit 16 and recorder 18 may be moved parallel to the axis of drum 4 in predetermined, discrete steps following the detection and recordation of each successive seismic trace. Appropriate motion is imparted to bar 20 by translator 22 which is adapted to convert a received electrical command signal to mechanical motion. The electrical command signal to translator 22 is supplied by position command 24.

Detector unit 16 includes frame member 26, sector 28 and pickup element 30. Sector 28 is slidably mounted on frame member 26 in such a manner that sector 28 will describe an arcuate path about field record portion 6 of drum 4. Pickup element 30 is mounted on sector 28 closely adjacent to field record portion 6 of drum 4. Frame member 26 of detector unit 16 also carries visual display mechanism 32 which continuously provides a visual representation of the position of pickup element 30 relative to a selected reference point.

Function generator 34 is adapted to produce a varying voltage proportional to the dynamic correction factor $Y=f(X)$ and is preferably directly coupled to the shaft of drum 4 for reasons which will be discussed hereinafter. As stated previously, the variable function represented by by the command voltage of function generator 34 introduces a dynamic correction which varies along the length of each seismic trace either continuously or in discrete steps. Zero command 36 is adapted to produce a voltage proportional to a predetermined difference between a selected reference point on the field record and a fixed reference point along the variable function, a fixed reference point on the cross section map, a like fixed reference point, or a combination of such fixed reference points. Static command 38 is adapted to produce at least one nonvarying or constant voltage proportional to a static correction which is the same throughout the length of each seismic trace but in some instances differs for each trace. Accordingly, a separate and distinct voltage should be provided for each seismic trace, and the appropriate voltage must be applied to each succeeding trace following the detection and recordation of each previous trace, as will be more fully explained hereinafter.

The voltages produced by function generator 34, zero command 36, and static command 38 are combined or algebraically added by adder 40. The output voltage of adder 40 is in turn fed to translator 42 which is adapted to convert this command voltage to mechanical motion. This mechanical motion is employed to slide sector 28 in its support and describe an arcuate path about field record portion 6 of drum 4. Obviously, this movement of sector 28 will serve to change the spatial relationship between pickup element 30 and a seismic trace passing a given point at a constant speed and pick up significant features of a seismic trace earlier or later than they would be picked up by a fixed pickup element. It is to be observed that, in contrast to this ability of the movable pickup of this invention to apply "positive or negative" corrections, i.e., to advance or delay a feature of the record, the prior art correctors referred to previously are restricted to correction by delay only.

The details of the basic components of the record corrector schematically shown in FIGURE 3, together with the details of operation of the corrector and certain variations and modifications thereof are set forth under appropriate subheadings in the description which follows. These subsections also refer specifically to FIGURES 4 through 9 inclusive, where such reference aids the description or is necessary to detail a novel subcombination of the record corrector combination.

Drum and drum drive

Drum 4 may be constructed of any suitable light weight material, such as, aluminum, and includes a drive shaft (not shown) passing through the center thereof. The shaft may be rotatably mounted on frame 2 of the record corrector by any well known means, such as, through bearings or the like.

Coupled to the shaft of drum 4 is motor 10 which is adapted to rotate drum 4 at a preselected, constant speed. Since it is highly desirable that the speed of rotation of drum 4 be maintained constant at all times, motor 10 is preferably a synchronous motor. Speed control of the rotation of drum 4 could also be attained by a suitable servomechanism. In any event, the speed of rotation of drum 4 should be constant and closely correlated with the speed of rotation of the drum employed in the original recording or preparation of the seismic field record.

Drum 4 may be a single drum consisting of two equal-diameter sections, such as, field tape portion 6 and cross section map portion 8. However, one major difficulty encountered in the correction of magnetically recorded seismic traces and the plotting of seismic cross section maps therefrom is that a comparatively large number of different magnetic field records are made which differ in width and length and which are recorded at different speeds. The mode of operation of the present seismic record corrector and the over-all combination of the present invention make the record corrector of the present application adaptable to this wide variety of field tapes without major modifications. To illustrate, field tapes presently employed by the industry vary in width from 2 to 12.25 inches and vary in length from 22.5 to 45.3 inches. The peripheral recording speeds are also quite variable and, at present, include from 3.6 inches per second to 7.5 inches per second. The majority of the field tapes now produced can be accommodated by the seismic record corrector of this application by adding to the drum shown in FIGURE 3 a third section smaller in diameter than the diameter of drum 4. This smaller section will obviously accommodate the shorter tapes now produced. It has been found that by making drum 4 approximately 16 inches in diameter and a third section 7.5 inches in diameter and by rotating the drum at a speed of nine revolutions per minute, practically all of the tapes now produced can be corrected and cross section plots made therefrom. It should be recognized, however, that it is sometimes desirable to play back and plot at a slower speed than the original recording speed in order to come within the response speed of certain of the elements of the record corrector.

In contrast to making a single drum, as indicated, separate field tape and cross section map drums may be made. Preferably, the cross section map drum is formed on its own shaft; and a field tape drum consisting of a drum of diameter equal to that of the cross section map drum, a drum smaller in diameter than that of the cross section map drum, or a combination drum having both small and large diameter portions, is mounted on a separate shaft. By suitable detachable coupling means, the two shafts may be coupled together so that the same motor will rotate both and both will rotate at the same angular speed. By this means, the field tape drum may be made removable and a different drum substituted when desired.

Detector

Inasmuch as magnetically recorded seismic data is preferable for use in a seismic record corrector, this mode of recording and detection will be treated in the preferred form of the present invention. However, there is also a variety of differing methods employed by the industry in the magnetic recording of seismic signals. Included among these methods are direct magnetic recording, amplitude modulated recording, frequency modulated recording, pulse width modulated recording, and amplitude modulated bias recording. These methods differ only in the form in which the seismic signal intelligence is placed on magnetic tape. Accordingly, pickup 30 of FIGURE 3 is a conventional magnetic reproducing head. Where systems other than direct magnetic recording are employed, it is necessary to insert between pickup 30 and recorder 18 appropriate apparatus to reconvert the modified, recorded information to a signal corresponding to the original seismic signal. For example, in the case of frequency modulated magnetic recordings or pulse width modulated magnetic recordings, this auxiliary equipment would include a demodulator.

The seismic record corrector of this invention may also be adapted to operate on any other known type of seismic field record by simply substituting for the preferred magnetic pickup, a pickup designed to detect the signal form of the particular seismic field record. Such pickups would, therefore, include trace followers to detect signals recorded in visible form by oscillographic or other means, sound on film detectors, variable light means for detecting variable width or variable density information on transparent film, and other such conventional detection systems.

Further, in the detection of seismic signals from the field record it is also necessary in most cases to include some form of signal amplifier between detector 30 and recorder 18.

Recorder

As is the case in the original recordation of seismic information, there are many and varied means of producing a cross section map of corrected seismic traces. Therefore, any known means for recording a seismic trace or seismic information in visible form may be employed. However, it has been found that a simple pen and ink recorder produces excellent results and is, therefore, the preferred mode of producing a cross section map. Other recorders could include optical systems for producing variable area or variable density records, oscillographic recorders, electrographic recorders, thermographic recorders, or like known recorders.

Lateral movement of detector and recorder

The lateral movement of detector 16 and recorder 18 may also include a number of variations. In its preferred form, however, translator 22 is a suitable servomechanism adapted to move detector 16 a distance equal to the distance between each trace on the field record following the detection of each trace or each revolution of drum 4. Likewise, recorder 18 is moved a predetermined distance following the recordation of each trace or each revolution of drum 4. Individual servomechanisms may be provided for detector 16 and recorder 18. By this variation, individual adjustments of the distances moved by detector 16 and recorder 18 may be made. For example, the field tape may have different spacings between traces depending upon the source of the tape or a single tape may even have varied spacings between the traces. Accordingly, by providing an individual lateral drive for detector 16, any of these variations can be compensated for. Likewise, it is sometimes highly desirable to adjust the spacings between traces on a cross section map and it is, therefore, desirable to be able to individually adjust the lateral movement of recorder 18. For example, although it is generally desirable to record all traces from a single field tape equal distances from each other, it is generally the practice to provide a wider space between one set of traces from one record and a second set of traces from a second record. By having an individual lateral drive for recorder 18 any desired variation of spacings between traces or between groups of traces may be readily provided for.

It is also desirable to provide means for decoupling recorder 18 from drive bar 20 so that it may be laterally moved by hand or to provide a second recorder which may be laterally moved by hand. This manual adjustment of the lateral position of a recorder permits the operator to play out and record timing traces, time break traces, or an individual seismic trace in order to locate a preselected point or points on the field record and correlate such point with a fixed reference point or points on the function produced by function generator 34 or a reference point on the cross section plotting sheet; and, thus, appropriately adjust zero command 36 as will be explained hereinafter.

Translator and sector carriage

Translator 42 of FIGURE 3 may be any suitable means for converting an electrical command signal to a mechanical arcuate movement of sector 28.

In its preferred form, translator 42 is a conventional servomechanism wherein a DC command voltage from adder 40 is fed to a comparator or "add-or-subtract" circuit. In the comparator circuit, the command voltage is compared with a second DC voltage which is representative of and proportional to the relative position of sector 28. The error voltage produced by the comparator circuit is fed to a conventional chopper to convert the error voltage to an AC signal. This AC signal is amplified by a conventional servo amplifier and is employed to operate a conventional AC servomotor. The servomotor is coupled to sector 28 and moves sector 28 in one direction or the other depending upon the resultant of the command and error voltages.

Figure 4:
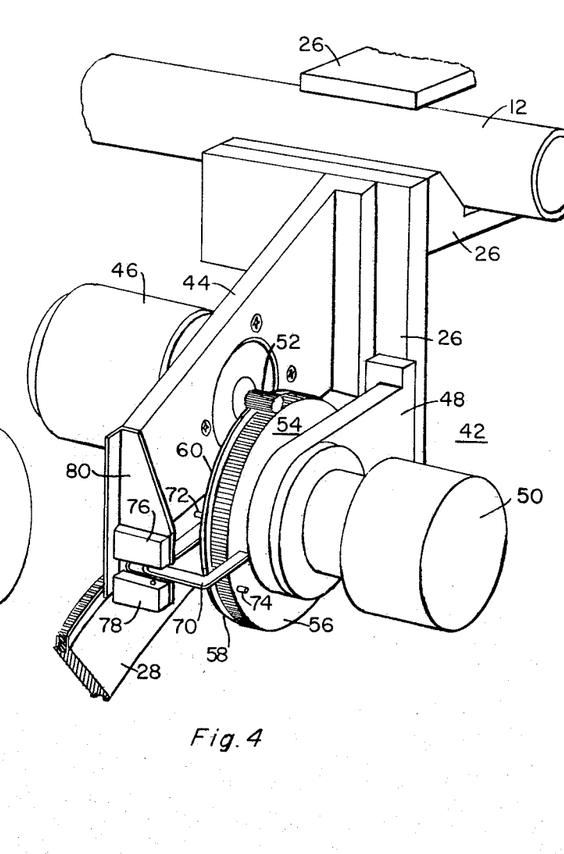
FIGURES 4 and 5 are isometric, right- and left-hand views, respectively, showing the details of a translator for imparting arcuate motion to a recording or detecting element carried by a sector.
Figure 5:
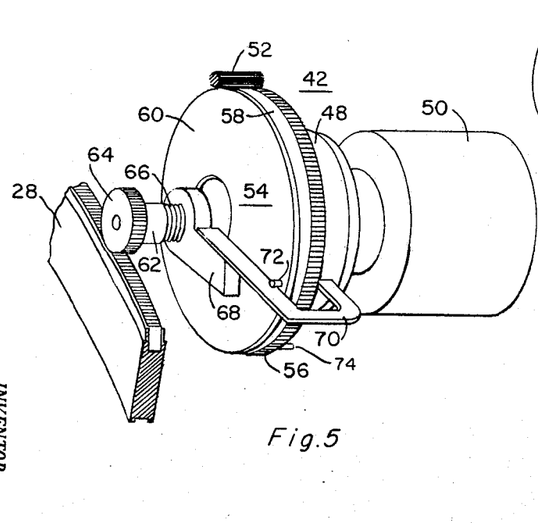

Although the external circuit of the servomechanism, described immediately above, is conventional, FIGURES 4 and 5 of the drawings show a novel system for driving sector 28 which incorporates several unusual protective features designed to overcome chatter and backlash in the drive system and to protect the basic components of the system.

Referring in detail to FIGURES 4 and 5, the servomechanism for driving sector 28 is designated generally by the numeral 42. Although translator 42 is shown physically separated from frame member 26 of detector unit 16 for purposes of simplifying the relationship of components shown in FIGURE 3, translator 42 is, in fact, mounted on frame member 26. Rigidly attached to forward extension 44 of frame member 26 is servomotor 46. As stated previously, servomotor 46 is preferably a conventional AC servomotor. Also attached to frame member 26 is forward extension 48, parallel to extension 44, designed to support potentiometer 50. Potentiometer 50 is a conventional type of potentiometer and in its preferred form has a maximum range of three revolutions.

Gear 52 is formed on the protruding end of the shaft of servomotor 46 and passes through extension 44 of frame member 26. Gear 54 is rigidly attached to the shaft of potentiometer 50 and cooperatively engages gear 52. Gear 54 is preferably made in three sections, a nylon portion 56 carrying the gear teeth, an intermediate section 58 consisting of a resilient disk having approximately the same diameter as the pitch of the gear teeth on section 56, and a back-up section 60 adapted to hold disk 58 rigidly on section 56 of the gear.

Mounted on the end of extension 62 of the shaft of potentiometer 50 is gear 64 which cooperatively engages teeth formed on sector 28. Formed near the end of potentiometer shaft extension 62 is a left-hand threaded section 66. Threadably mounted on threaded section 66 of potentiometer shaft extension 62 is follower block 68.

In its preferred form, follower block 68 is also made of nylon. Rigidly attached to follower block 68 is spring metal contact means 70 which cooperates with stop pins 72 and 74 which are mounted on sections 60 and 56, respectively, of gear 54. Cooperating with spring metal contact means 70 are cut-off microswitches 76 and 78 which are electrically connected to servomotor 46 and are rigidly attached to plate 80 which, in turn, is rigidly attached to extension 44 of frame 26.

The lead of threaded section 66 of potentiometer shaft extension 62 and the position and length of stop pins 72 and 74 are selected such that three complete revolutions of the shaft of potentiometer 50 will laterally move spring metal contact 70 out of contact with one of the stop pins and into contact with the other of the stop pins. Thus, as servomotor 46 rotates the shaft of potentiometer 50 and gear 54 in a counter-clockwise direction, pin 72 will contact spring metal contact 70 and urge spring metal contact 70 toward microswitch 78 and away from microswitch 76. Microswitch 78 will break the circuit to servomotor 46 thus stopping the initial rotation of the servomotor. Spring metal contact 70 also serves to reduce the shock load on a sudden stop by virtue of its resilience. Similarly, when the signal to servomotor 46 causes a clockwise rotation of three revolutions of the shaft of potentiometer 50 and gear 54, spring metal contact 70 will be moved out of contact with stop pin 72 and into contact with stop pin 74. Contact 70 will then be forced into contact with microswitch 76 breaking the circuit to the servomotor and rotation of servomotor 46 will be stopped.

It is obvious from the above description of the relationship of the component parts that a number of control functions are performed by the cooperation of spring metal contact 70, stop pins 72 and 74, and microswitches 76 and 78. First, these elements cooperate to prevent over-running of gear 64 on sector 28 in either direction. Secondly, these elements prevent rotation of potentiometer 50 beyond its maximum allowable limits and thus act as a protective device to prevent damage to the potentiometer. In addition, the spring action of spring metal contact 70 prevents damage to the gear teeth or the other components by absorbing the shock of a sudden stop.

Resilient section 56 of gear 54 also performs the highly desirable functions of preventing chattering between gear 54 and gear 52 and preventing backlash in the system. Although a number of conventional anti-backlash and anti-chatering mechanisms have been tested for use in the translator mechanism, it has been found that the simple modified gear having resilient section 56 is far superior.

Figure 6:
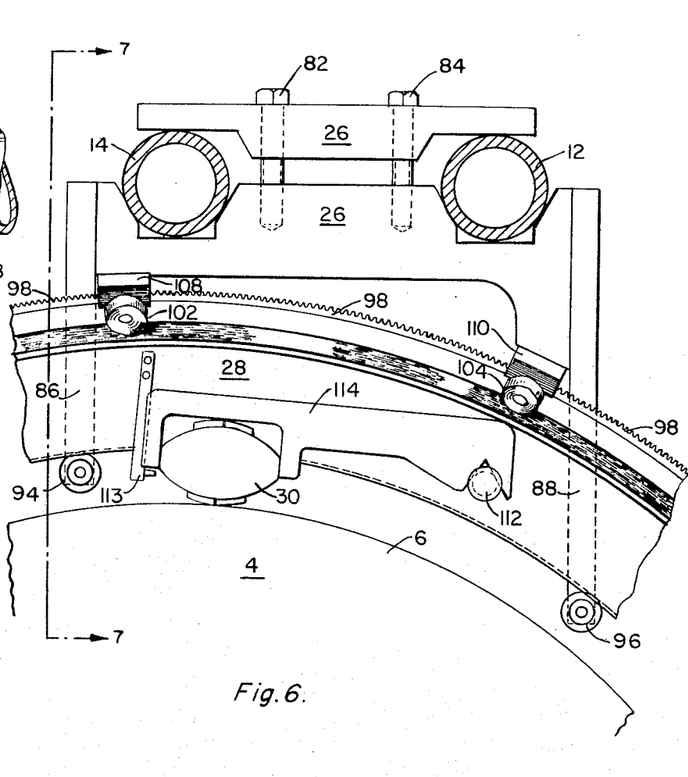
FIGURE 6 is a side view of a carriage for a movable sector carrying a recording or detecting element.
Figure 7:
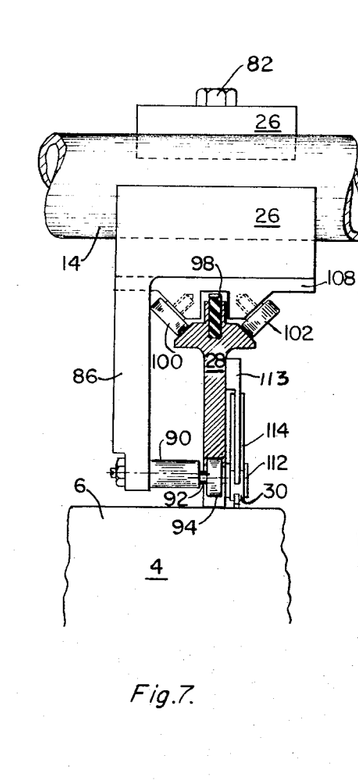
FIGURE 7 is a sectional view of the carriage of FIGURE 6 taken along line 7—7 of FIGURE 6.

FIGURE 6 of the drawings, partially in section, shows the details of the carriage of sector 28 and the mounting on sector 28 of pickup element 30. FIGURE 7 is an end view partially in section taken along line 7—7 of FIGURE 6.

Referring specifically to FIGURES 6 and 7, frame member 26 of detector unit 16 is mounted on tubular members 12 and 14 by means of bolts or other securing means 82 and 84. Depending from frame member 26 and forming a part thereof are legs 86 and 88, respectively. Rotatably mounted in depending leg 86 is adjustment pin 90 having an extension 92 formed on the end thereof eccentric to the center line of pin 90. Mounted on eccentric extension 92 is roller bearing 94. Roller bearing 96 is similarly mounted on the end of leg 88. Formed in the bottom of sector 28 is a raceway in which roller bearings 94 and 96 ride. Mounted in the top edge of sector 28 is nylon gear section 98. Lateral extensions near the top of sector 28 are milled at an oblique angle of 45° from a center line passing through sector 28 and gear segment 98. In rolling contact with the oblique extensions of sector 28 are roller bearings 100, 102, 104 and a bearing complementary to 104 (not shown). Roller bearings 100 and 102 are fixedly mounted on support block 108 which is secured to the bottom of frame member 26. Roller bearing 104 and the corresponding roller bearing on the opposite side (not shown) are mounted on support block 110 which is also attached to frame member 26. Protruding from the side of sector 28 is fulcrum 112. Fulcrum 112 has formed therein a groove adapted to carry lever arm 114. Pickup element 30 is rigidly mounted on lever arm 114 in a manner such that pickup 30 rides freely on the surface of field record section 6 of drum 4. Pickup support 113 is adjustably mounted on sector 28 so that it can be raised to thereby lift pickup 30 from the surface of the record when not in use.

It will be apparent from observation of the arrangement of parts of FIGURES 6 and 7 that sector 28 can be adjusted to place proper bearing weights at its points of contact with bearings 100, 102 and 94 by simply adjusting rotatable pin 90 which, in turn, adjusts the height of bearing 94 due to the eccentric mounting of the bearing 94 on pin 90. The placement of roller bearings 100 and 102 at 45° angles to the center line passing through sector 28 and bearing 94 also provides perfect and accurate alignment of sector 28 and prevents any side movement of the sector.

Pickup element 30 is shown in FIGURES 6 and 7 to be a magnetic transducer which rides on drum 4 with a bearing weight substantially equal to the weight of pickup element 30 itself since it has been found that by properly locating fulcrum 112 on sector 28 the weight of arm 114 can be balanced about the fulcrum. By mounting pickup 30 in this manner it may be seen that pickup 30 is free to follow any discontinuities in the surface of drum 4 or the magnetic field tape, yet this is accomplished by having a minimum of bearing weight between pickup 30 and drum 4 and consequent wear on pickup 30 or the field tape is eliminated.

*Visual display*

Figure 8:
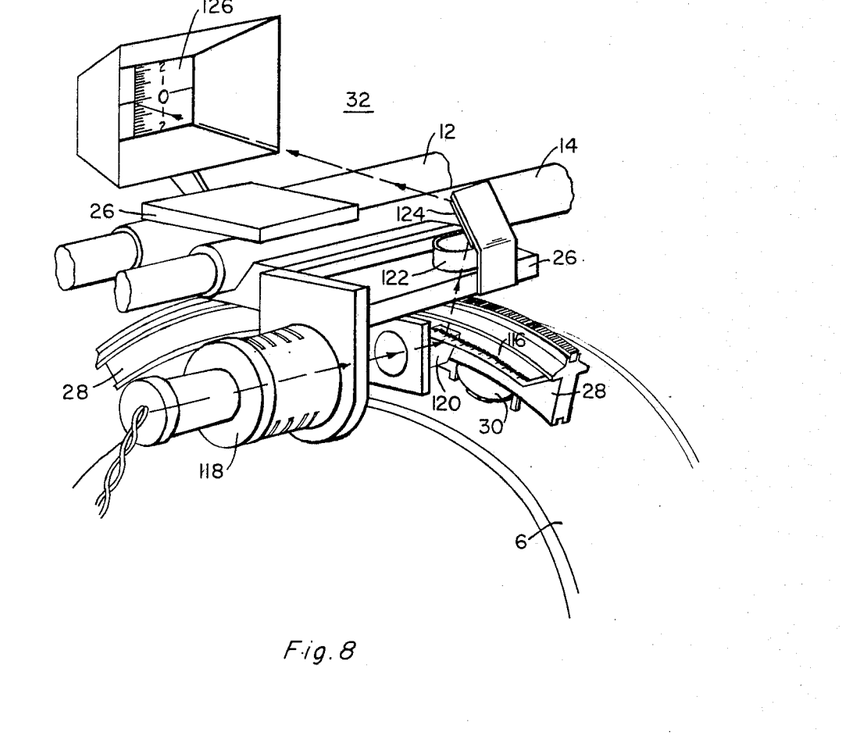
FIGURE 8 is an isometric view showing the details of a visual display mechanism for displaying the instantaneous position of a movable recorder or detector element relative to a reference point.

The visual display component designated generally as 32 in FIGURE 3 of the drawings is shown in detail in FIGURE 8.

As will be discussed in more detail in the description of the operation of the record corrector of the present invention, the subject visual display mechanism has a number of advantages which contribute to the simplicity of the record corrector and its ease of operation. Primarily, the visual display mechanism provides a means whereby any adjustment of the spatial relationship between the seismic traces of the field record and pickup element 30 may be continuously observed either prior to or during the operation of the record corrector. When potentiometers are employed to produce a command signal which is later translated into relative movement of pickup 30 with respect to a seismic trace of the field record, such as in static command 38 or zero command 36, the visual display mechanism permits the use of non-calibrated potentiometers in the encoding of correction data. Obviously, since the relative position of pickup 30 may be observed directly by visual display mechanism 32, it is unnecessary to employ expensive calibrated potentiometers, to recalibrate or check the calibration of such potentiometers, or to make any provision for the elimination of changing constants in the encoding elements. As will be obvious from the discussion which follows, visual display 32 may be employed to observe the encoding of any correction data, to observe the total of two or more encoded corrections, or to observe the operation of a continuously changing or dynamic correction signal, such as that produced by function generator 34. Further, during the actual operation of the seismic record corrector, the sum total of all corrections may be continuously monitored throughout the operation, thus permitting the operator to observe whether all elements of the command system and the system which translates the commands into mechanical motion of detector 30 are operating properly. It is believed obvious that direct observation of the actual relative position of detector 30 with respect to a seismic trace on the field record is vastly superior to observation and control of the command or its operation at a point remote from the detector itself.

Referring now to FIGURE 8, visual display mechanism 32 is mounted on frame 26 of detector unit 16. In the specific embodiment shown, a transparent scale 116 is mounted on sector 28 and carries appropriate indicia representative of the position of pickup 30. Obviously, scale 116 may be calibrated in terms of any suitable indicia such as distance along the field record, time along the length of the field record, or the like. Preferably, however, since the field record and the cross section plot are generally prepared with travel time scales expressed in milliseconds and all corrections are encoded in terms of travel time in milliseconds, scale 116 is calibrated in millisecond units.

Light source 118 is rigidly mounted on frame 26 at a point laterally removed from and slightly below scale 116. Light from light source 118 is projected into the end of light directing prism 120 which is mounted on frame 26 below scale 116. Light directing prism 120 changes the path of the light beam from source 118 and projects this light beam upwardly through scale 116. After passing through scale 116, the light beam then passes through focusing lens 122 mounted on frame 26. Mirror 124, mounted on frame 26 above focusing lens 122, serves to again redirect the path of the light beam and project the light beam onto a display screen 126 which is positioned on frame member 26 so as to be readily observable by the operator. By providing a suitable reference line on screen 126, the indicia projected from scale 116 will show the position of the numerical indicia on scale 116 and consequently of pickup 30 relative to a fixed reference point.

Although a specific and preferred visual display mechanism is shown and described, it will be obvious to those skilled in the art that various modifications of this mechanism may be made without departing from the basic concept disclosed. It should also be observed that the basic concept of directly displaying the relative position of a movable detector with respect to a fixed reference point is equally applicable to apparatus other than the record corrector of the present application. It will be apparent from the above description that the visual display mechanism is generally applicable to observing and adjusting the position of a movable detector element or recording element relative to a fixed reference point or relative to a moving record sheet which is adapted to travel in a path parallel to the path described by the movable detector or recorder element. Accordingly, the visual display mechanism of the present application can be employed in any time modulation system where the pickup or recording element is subjected to relative movement with respect to a record or recording medium. Thus, in addition to the record corrector application shown, the visual display mechanism is adapted to observation and adjustment of the relative movement of a recording element, such as the recording pen of the present invention, or nonstylus type recorders employed in seismic record correctors generally. It will also be obvious to those skilled in the art that the visual display mechanism may be employed in detecting or recording mechanisms aside from those employed in the art of seismic record correction.

*Zero command*

As pointed out above, zero command 36 is designed to provide a voltage proportional to an arcuate movement of pickup 30 relative to the seismic traces appearing on a seismic field record in order to begin the pickup or detection of the seismic trace at some preselected point along the trace in correlation with an independent fixed reference appearing on the cross section map or the function generated by function generator 34.

The preselected point of the seismic field record may be any one of several points. For example, it may be the signal created and recorded as a time break signal when the seismic energy is initiated, it may be the signal received by any one of the detectors as a result of direct transmission from the source of seismic energy to the detectors and known as the first break pulse, or it may be some arbitrary reference point along any one of the seismic traces of the field record. In any event, irrespective of the selected starting point along each of the seismic traces, this starting point must be correlated with one or more fixed reference points which are independent of the seismic field record. Obviously, when a function which varies over the length of a seismic trace is generated and is applied to the seismic trace along its entire length, the beginning of this function must be correlated with the same point on the field record. In addition, if a cross section map having a preprinted starting point or starting line is employed, it is also desirable that the preselected point on the seimsic record be correlated with this zero starting point. It is also obvious that several such correlations may be necessary and several corerctions compensating for differences between the preselected starting point on the field records and the independent fixed starting points must be introduced. Accordingly, a command signal proportional to a spatial change of the position of detector 30 with respect to the seismic traces of a field record should be introduced in order to eliminate any error in travel time or depth measurements which might result from any such misalignment.

The voltage necessary to apply these corrections and to change the position of detector 30 may be produced by a number of known voltage producing devices. Preferably zero command 36 is a potentiometer which may be adjusted to produce a voltage proportional to the desired arcuate movement of sector 28. Since the relationship of all seismic traces of a single field record to one of these independent zero or starting points will be the same, a single, constant correction will be applied to each of the seismic traces appearing on a single seismic record and each such trace will be picked up or detected following a preliminary shift of sector 28 which is the same for each trace. However, since traces from more than one field record are desirably recorded in side-by-side relationship on a cross section map and there is no reliable and exact means for placing a second or subsequent field record on the record-carrying portion 6 of drum 4 in exactly the same position, it will in all probability be necessary to adjust the starting position for each successive field record or group of seismic traces.

*Static command*

Static command 38, like zero command 36, is a component adapted to produce a voltage proportional to some predetermined arcuate movement of detector 30 with respect to the seismic traces appearing on a seismic field record. As previously pointed out, static corrections which must be applied to a seismic trace or seismic traces include a correction to eliminate the effects of the weathered layer and a correction adapted to eliminate errors due to differences in elevation between the various seismic detectors or pickups. Also, as in the case of applying a zero correction or a zero command, the static correction will be constant throughout the length of an individual seismic trace; and, therefore, each increment along the trace will be detected at a delayed or advanced time or point in space which is exactly the same as that for each other increment.

The static command may also be created by any one of several known components adapted to produce a voltage proportional to the desired correction and may, therefore, be a suitable potentiometer. However, since the static command, due primarily to the inclusion of the elevation correction, is different for each individual trace of a seismic field record, an individual potentiometer should be provided for each seismic trace of the seismic field record, and the voltage produced by each potentiometer should be sequentially applied to the appropriate seismic trace.

Function generator

Function generator 34 may be any known means for producing a command voltage which varies with time either continuously or in discrete steps. For example, the function generator may be a tapered and suitably tapped potentiometer adapted to produce a plurality of command voltages which decrease in value with increase in time over the length of a seismic trace. Similarly, a plurality of command voltages produced as a result of the read-out of a series of digital values on punched tape would produce an equivalent varying function. Preferably, however, function generator 34 is a curve follower adapted to follow a curve traced in conductive ink or the like and produce a continuously varying voltage proportional to the abscissa of the curve.

Since the dynamic correction is simply an approximation at best, it may be acceptable in some cases to employ a single curve or a single set of digital data to correct all traces of a seismic field record or several records in a given area. However, it is preferred that an individual curve be provided for each individual seismic trace in order to compensate more exactly for errors which exist in the time position of pulses produced by near surface reflecting horizons. In its preferred form, therefore, function generator 34 would be a curve follower operating on a family of curves corresponding in number to the number of seismic traces on a single seismic record, and this family of curves could be used for any seismic record in a particular area so long as the same seismic detector geometry or spread is employed.

Adder

The command voltages produced by zero command 36, static command 38 and function generator 34 are all summed or added together by means of adder 40. Thus, a single composite voltage or composite command corresponding to the sum total of the individual commands will be produced. In its preferred form, adder 40 is an adding resistance network such as that shown and described by Korn and Korn, "Electronic Analog Computers," McGraw-Hill Book Co., Inc., 1952, at pages 11 through 14. It has been found that in using this adding resistance network in the seismic record corrector of the present invention it is necessary that the branch resistances be substantially higher than the reference resistance.

Other known means of adding or summing a plurality of voltages may be substituted for the adding resistance network specifically referred to.

The composite command signal produced by adder 40 is, of course, transmitted to translator 42 where this signal is converted to mechanical motion to arcuately move sector 28 in accordance with the composite command signal.

Operation

The operation of the seismic record corrector of the present application will be described with reference to the correction of a seismic field record having 20 seismic traces in addition to an appropriate timing signal or signals and a time-break signal. It should be understood that field records having a larger or smaller number of seismic traces recorded thereon may be corrected simply by adding or subtracting a suitable number of components where a plurality of components equivalent to the number of seismic traces is stated to be necessary or desirable.

Figure 9:
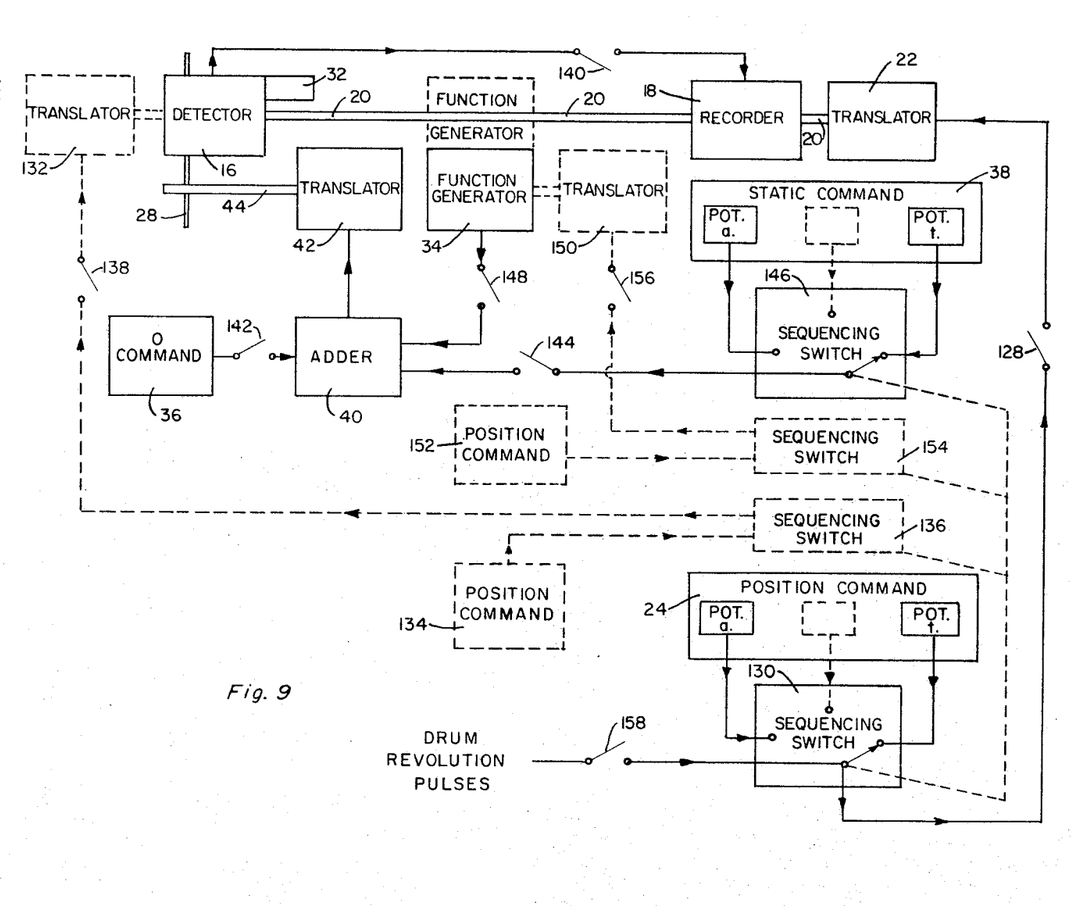
FIGURE 9 is a block diagram of the basic electrical circuit of the record corrector of the present invention together with certain variations and modifications of the basic circuit.

FIGURE 9 will be referred to in connection with the description of operation, and it should be noted that like numerals are employed to designate like components which also appear on the other figures and that those components and electrical connections shown by dashed lines are variations or modifications of the basic apparatus which will improve the over-all operation of the seismic record corrector or contribute to its universal applicability to meet the demands of the original mode of recording or the desires of the operator in presenting the cross section plot.

As stated above, translator 22 is adapted to convert a suitable command voltage to a lateral mechanical movement of detector 16 and recorder 18. The command signal to translator 22 is supplied by position command 24. Position command 24 may comprise a single potentiometer or 20 individual potentiometers, $a$ through $t$, inclusive, corresponding in number to the number of seismic traces to be corrected and plotted. Since the spacing between the seismic traces on the field record will be the controlling factor in the setting of position command 24, potentiometer $a$ of position command 24 is set by closing switch 128 and moving sequencing switch 130 to connect potentiometer $a$ into the system. Potentiometer $a$ is then adjusted until a maximum signal level representing the first trace of the field record is observed on a suitable signal level meter (not shown). Thereafter, sequencing switch 130 is successively moved to connect potentiometers $b$ through $t$ into the system and these potentiometers are adjusted to pick up traces 2 through 20 of the field record. Sequencing switch 130 is a conventional sequencing switch adapted to sequentially connect potentiometers $a$ through $t$ to translator 22.

Having thus adjusted position command 24 to pick up each of the traces from the seismic field record, sequencing switch 130 will be automatically operated to consecutively switch from potentiometer $a$ through potentiometer $t$ as each individual trace is detected by detector 16 and recorded by recorder 18. Since translator 22 laterally moves detector 16 and recorder 18, recorder 18 will move in discrete steps proportional to the distance between the seismic traces on the field record and the spacing of the traces on the cross section plot will obviously be dictated by the gear ratios employed in coupling rod 20 to detector 16 and recorder 18.

It is generally more desirable to have separate position commands and translators for detector 16 and recorder 18. Therefore, translator 132, similar to translator 22, may be connected mechanically to detector 16. The position command signals to translator 132 will be provided by position command 134 similar to position command 24. The appropriate position command voltage will be applied by sequencing switch 136 which is ganged to sequencing switch 130, and these signals will be transmitted to translator 132 through switch 138. By providing separate position commands and lateral movement mechanisms for detector 16 and recorder 18, the adaptability of the record corrector may be substantially improved. The separate translator for detector 16 will thus be available to handle a record having different spacings between seismic traces or a series of records having different lateral spacings between traces. Further, the adjustment of detector 16 to correspond with the spacings of the traces on the field record will not dictate the spacings between transcribed traces of the cross section plot, and position command 24 may be adjusted to meet the desires of the individual operator. For example, it is sometimes desirable to closely space the traces from a single seismic record, skip a larger space, and then record a series of traces from a related seismic record; or to adjust the spacings between the traces on the cross section plot in some other manner to make the cross section plot more conducive to study and analysis.

Having adjusted position command 24 to pick up each of the seismic traces of the field record at its appropriate position on the record, switch 128 will be opened, switch 140 in the line leading from detector 16 to recorder 18 will be closed, and switch 142 located in the line between zero command 36 and adder 40 will be closed. Since it is extremely difficult if not impossible to mount the field record tape on section 6 of drum 4 with the same reference point on the record at exactly the same point on the drum each time and, in the case of magnetically recorded seismic data, no visible reference indicia is marked thereon, it is necessary to locate a preselected starting point or reference point on the tape and to correlate this reference point with a zero reference line on the cross section map. The preselected reference point on the field record may be the pulse created on one of the seismic traces by directly transmitted elastic waves, i.e., the first break pulse, the pulse created on the time break trace at the instant the elastic waves are initiated, or some other arbitrary reference point along one of the traces on the record. Usually, the time break pulse is selected as the reference point. In order to correlate this instant on the field record with the zero line on the cross section map, the time break signal is played out by energizing detector 16 and recorder 18 and rotating drum 4 with the switches indicated previously closed. If the time break pulse does not coincide with the zero line on the cross section map, zero command 36 is adjusted and the playout repeated until coincidence is obtained. If no preprinted zero line is present on the cross section map, this adjustment of zero command 36 may be dispensed with but the time break trace should be played out on the map so that a zero reference line can later be drawn in coincident with the time break pulse. However, even though no preprinted zero line appears on the cross section map, when more than one record is to be recorded on one map it is still necessary to adjust zero command 36 to align the time break pulses on the second and each successive record with that on the first record since it is quite unlikely that each field record will be placed on the drum with the time break pulse at the same point.

In addition to this coordination of the field record with the cross section map, it is also necessary to correlate the field record with the fixed starting point of the function generated by function generator 34. This is true since the dynamic correction injected by function generator 34 is a function of time along the field record. Thus, the starting time of the function must be correlated with the same starting time on the field record. This correlation is also brought about by adjustment of zero command 36. Generally, the starting time on the function will be the same as the preselected reference point on the field record, but this is not necessarily so. If such coincidence does not exit, a difference in milliseconds between the starting time of the function and the preselected reference point on the record will be known or can be ascertained. With this information, zero command 36 can then be adjusted to move pickup element 30 the determined time along the field record as observed on visual display 32.

Having encoded, in zero command 36, an initial composite command which can be translated into a shift in the position of detector 16, this shift will be applied before each successive trace of the field record is picked up.

Switches 140 and 142 are then opened and switch 144 in the line connecting sequencing switch 146 and static command 38 to adder 40 will be closed. Sequencing switch 146 is also ganged to sequencing switch 130 and is adapted to sequentially apply the voltages produced by static command potentiometers *a* through *t* of static command 38. With visual display 32 calibrated in terms of milliseconds of time on the seismic field record, the observer then adjusts the pickup of detector 16 to its zero reference position. Potentiometers *a* through *t*, inclusive, of static command 38 are thereafter successively connected into the system and adjusted by observing the millisecond displacement of the pickup of detector 16 from its zero reference position until the preselected static corrections are encoded on each of the potentiometers.

Since function generator 34 has a fixed variable correction already encoded therein, it is not necessary to further adjust this mechanism. However, if it is desired to play out and observe this correction, all other switches are opened, switch 148 is closed, the function is generated and the functional values, in terms of milliseconds of movement of the pickup of detector 16, may be observed on visual display 32.

As stated previously, function generator 34 may produce a single function applicable to all seismic traces to be corrected or it may produce a plurality or family of functions equal in number to the number of seismic traces. In the latter case, some means must be provided for sequentially switching from one function to each successive function as each successive seismic trace is played out. Accordingly, translator 150, similar to the other translators, would be mechanically connected to function generator 34 and the command signal to translator 150 would be supplied by position command 152 through sequencing switch 154, ganged to sequencing switch 130, and switch 156. Where a family of functions equal in number to the number of seismic traces to be corrected is employed, the function generator could alternatively be coupled to translation rod 20 and operated by translator 22.

Sequencing switch 130 and those other sequencing switches ganged with sequencing switch 130 are actuated by pulses from drum 4 supplied through switch 158, a switching pulse being provided following each revolution of the drum. Accordingly, with the desired commands encoded into the record corrector, switches 128, 140, 142, 144, 148, and 158 are closed and the motor actuating the drum is also set in operation. From this point on, the entire operation is automatic, each individual trace being detected, corrected, and, finally, recorded on the cross section map as the series of sequencing switches, actuated by the pulses from drum 4, sequentially switch the operation from trace to trace. Obviously, sequencing switch 130 may be provided with a switching pulse each second revolution of the drum or any desired multiple of a single revolution.

*Auxiliary components and modifications*

Recognizing the flexibility of operation of the record corrector of the present invention and the many advantages flowing from the preferred use of magnetically recorded field records, it is obvious that many variations and modifications of the system specifically described herein can be made without departing from the basic concepts set forth.

By way of example, it is often desirable to filter the raw signals detected from the field record or to try a number of different filter settings in such filtering operations in order to eliminate undesirable noise components contained in the raw signals. Such filtering may be carried out subsequent to detection and correction of the seismic traces but prior to plotting of the corrected traces on the cross section map. It should be noted at this point that the sequential detection, correction and recording of one trace at a time permits one to employ a single filter, amplifier, demodulator or other additional item of equipment rather than 20 such items of equipment as would be the case if 20 traces were to be simultaneously detected, corrected and recorded. In operating on seismic traces to facilitate study and interpretation, it is also desirable in some cases to stack or mix several traces to form composite traces and, thereby, cancel out noise components or emphasize desired features of the traces. This stacking and mixing can also be performed as an integral operation when utilizing the record corrector of the present invention. When sequential detection, correction and recording of seismic traces is carried out as pointed out above, it will be necessary to provide some temporary or auxiliary storage means, such as, an additional magnetic tape on the drum of the record corrector. This additional tape permits the operator to record several corrected traces in sequence and temporarily store these traces until the total number of traces to be added are stored and thereafter combine the traces. It should be clearly understood that this auxiliary or temporary storage for purposes of mixing or carrying out other interpretive procedures is not the equivalent of the auxiliary or temporary storage heretofore practiced during the process of time correcting the traces. Accordingly, temporary or auxiliary storage of corrected traces as previously described does not depart from applicants' definition of the term "direct electrical connection" between the detector and recorder of the present invention and the exclusion from this definition of temporary or auxiliary storage of detected signals prior to or during the process of correction. It will be obvious to those skilled in the art that other auxiliary components may be added and other modifications may be made without departing from the present invention. Therefore, the specific examples set forth herein and the specific modes of operation described are meant to be by way of illustration only and not by way of limitation, and applicants' invention is to be limited only in accordance with the limitations of the claims hereinafter set forth.

We claim:

1. In apparatus for correcting a plurality of seismic signals reproducibly recorded on a first record to produce a corrected record of said signals with significant features thereof differently positioned on said corrected record, including, a frame member, a first record drum rotatably mounted on said frame member and adapted to carry said first record, a detecting transducer mounted on said frame member adjacent said first record drum and adapted to detect said seismic signals, a corrected record drum rotatably mounted on said frame member and coupled to said first record drum for rotation therewith, said corrected record drum being adapted to carry said corrected record, a recording transducer mounted on said frame member adjacent said corrected record drum and adapted to receive said detected seismic signals from said detecting transducer and record said seismic signals, means for rotating said first record drum and said corrected record drum and a voltage source: the improvement comprising support means carrying one of said transducers and movably mounted on said frame member to permit movement of said one transducer in a direction parallel to the direction of rotation of the complementary one of said drums and relative to a reference position on said frame member; electrical command means connected to said voltage source and adapted to produce a voltage proportional to predetermined changes in the positions of said significant features of said signals which differ at various positions along the length of said signal; and servomechanism means, including means for producing a voltage proportional to the instantaneous position of said one transducer relative to said reference position, comparator means adapted to obtain an algebraic sum of said command voltage and said instantaneous position voltage, and motor means connected to said comparator means and adapted to translate said algebraic sum of said voltages into a mechanical movement of said one transducer.

2. Apparatus in accordance with claim 1 wherein the servomechanism means is adapted to move the one transducer in either direction relative to the reference position on the frame member.

3. Apparatus in accordance with claim 1 wherein the one transducer carried by the support means is an electromagnetic transducer.

4. Apparatus in accordance with claim 1 wherein the detecting transducer is an electromagnetic transducer and the recording transducer is a stylus-type recorder.

5. Apparatus in accordance with claim 1 wherein the first record drum is detachably coupled to the corrected record drum in a manner to permit replacement of said first record drum with a drum of different diameter.

6. Apparatus in accordance with claim 1 wherein the electrical command means includes a first source of voltage proportional to predetermined changes in the position of significant features of said seismic signals which are the same throughout the length of said signal, a second source of voltage proportional to predetermined changes in the position of significant features of said seismic signals which differ from one another along the length of said seismic signal and adder means for algebraically adding the voltage from said first source of voltage and the voltage from said second source of voltage.

7. In apparatus for correcting a plurality of seismic signals reproducibly recorded on a first record to produce a corrected record of said signals with significant features thereof differently positioned on said corrected record, including, a frame member, a first record drum rotatably mounted on said frame member and adapted to carry said first record, a detecting transducer mounted on said frame member adjacent said first record drum and adapted to detect said seismic signals, a corrected record drum rotatably mounted on said frame member and coupled to said first record drum for rotation therewith, said corrected record drum being adapted to carry said corrected record, a recording transducer mounted on said frame member adjacent said corrected record drum and adapted to receive said detected seismic signals from said detecting transducer and record said seismic signals, and means for rotating said first record drum and said corrected record drum: the improvement comprising, support means carrying one of said transducers and movably mounted on said frame member to permit movement of said one transducer in a direction parallel to the direction of rotation of the complementary one of said drums and relative to a reference position on said frame member; electrical command means adapted to produce a voltage proportional to predetermined changes in the positions of said significant features of said signals; servomechanism means, including, means for producing a voltage proportional to the instantaneous position of said one transducer relative to said reference position, comparator means adapted to obtain an algebraic sum of said command voltage and said instantaneous position voltage, and motor means adapted to translate said algebraic sum of said voltages into a mechanical movement of said one transducer; and visual presentation means adapted to display the instantaneous position of said one transducer relative to said reference position.

8. Apparatus in accordance with claim 7 wherein the visual presentation means includes a scale, calibrated in terms of the position of the one movable transducer relative to the reference position on the frame member, mounted on the support means; and optical means associated with said scale adapted to visually display the indicia of said scale.

9. In apparatus for correcting a plurality of seismic signals reproducibly recorded on a first record to produce a corrected record of said signals with significant features thereof differently positioned on said corrected record, including, a frame member, a first record drum rotatably mounted on said frame member and adapted to carry said first record, a detecting transducer mounted on said frame member adjacent said first record drum and adapted to detect said seismic signals, a corrected record drum rotatably mounted on said frame member and coupled to said first record drum for rotation therewith, said corrected record drum being adapted to carry said corrected record, a recording transducer mounted on said frame member adjacent said corrected record drum and adapted to receive said detected seismic signals from said detecting transducer and record said seismic signals, and means for rotating said first record drum and said corrected record drum: the improvement comprising, sector means carrying one of said transducers and movably mounted on said frame member to permit movement of said one transducer arcuately about and in a direction parallel to the direction of rotation of the complementary one of said drums; electrical command means adapted to produce a voltage proportional to predetermined changes in the positions of said significant features of said signals; servomotor means adapted to receive said command voltage and convert the same to rotation of the shaft of said motor; and gear means operatively coupling said shaft of said servomotor to said sector to produce arcuate movement of said one transducer about said complementary one of said drums in response to the rotation of said shaft of said servomotor.

(References on following page)

References Cited

UNITED STATES PATENTS

| | | | |
|---|---|---|---|
| 2,343,621 | 3/1944 | Williams | 88—24 |
| 2,697,963 | 12/1954 | Fink | 88—24 |
| 2,800,639 | 7/1957 | Lee | 340—15.5 |
| 2,836,359 | 5/1958 | Mazzagatti | 235—61.6 |
| 2,856,128 | 10/1958 | Ferre | 235—61.6 |
| 2,858,523 | 10/1958 | Hawkins | 340—15 |
| 2,860,293 | 11/1958 | Salamonovich | 318—28 |
| 2,863,705 | 12/1958 | Gluchowicz | 308—6 |
| 2,876,428 | 3/1959 | Skelton et al. | 340—15 |
| 2,881,031 | 4/1959 | Comfort | 308—6 |
| 2,885,612 | 5/1959 | Larsen | 318—28 |
| 2,967,291 | 1/1961 | Carlisle et al. | 340—15 |
| 2,986,725 | 5/1961 | Dirks | 340—174.1 |
| 2,990,535 | 6/1961 | Parkinson et al. | 340—15.5 |
| 3,012,223 | 12/1961 | Begun et al. | 340—15.5 |
| 3,075,172 | 1/1963 | Loper et al. | 340—15.5 |
| 3,077,573 | 2/1963 | Wendenburg | 340—15.5 |
| 3,095,552 | 6/1963 | Alexander et al. | 340—15.5 |

SAMUEL FEINBERG, *Primary Examiner.*

LEO SMILOW, KATHLEEN H. CLAFFY, CHESTER L. JUSTUS, BENJAMIN A. BORCHELT, *Examiners.*

C. L. WHITHAM, A. M. LOVE, R. M. SKOLNIK,
*Assistant Examiners.*